United States Patent [19]

Albert

[11] Patent Number: 4,516,306
[45] Date of Patent: May 14, 1985

[54] SEMI-AUTOMATIC PIPE THREADING PLANT AND APPARATUS THEREFOR

[75] Inventor: Robert J. Albert, Harvey, La.

[73] Assignee: Tubular Threading Incorporated, Marrero, La.

[21] Appl. No.: 433,967

[22] Filed: Oct. 13, 1982

[51] Int. Cl.³ ............................................. B23P 41/04
[52] U.S. Cl. ................................... 29/564.7; 29/33 T; 29/563; 29/564; 10/107 PH
[58] Field of Search .................. 29/33 T, 33 P, 564.7, 29/564.2; 414/431, 433, 745, 432; 198/782, 345; 10/107 PH

[56] References Cited

U.S. PATENT DOCUMENTS

| | | | |
|---|---|---|---|
| 2,768,550 | 10/1956 | Ingwer et al. | 10/87 X |
| 3,039,181 | 6/1962 | Sawdey | 29/237 |
| 3,090,513 | 5/1963 | Handwerk et al. | 414/433 |
| 3,599,261 | 8/1971 | Fohl | 10/87 |
| 3,934,375 | 1/1976 | Hornstein | 198/345 X |
| 3,985,221 | 10/1976 | Lueders | 82/2.7 X |
| 4,025,219 | 5/1977 | Baumann et al. | 10/87 X |
| 4,029,196 | 6/1977 | Ekholm | 414/433 |
| 4,062,456 | 12/1977 | Birdwell | 414/745 X |
| 4,149,626 | 4/1979 | Holt | 198/809 X |
| 4,300,672 | 11/1981 | Millar et al. | 29/33 T |
| 4,392,770 | 7/1983 | Castille | 414/432 |
| 4,404,721 | 9/1983 | Ohyama | 29/33 T |
| 4,417,363 | 11/1983 | Lee, Jr. | 10/107 PH |

FOREIGN PATENT DOCUMENTS

| | | | |
|---|---|---|---|
| 2903741 | 8/1980 | Fed. Rep. of Germany | 29/33 T |
| 165412 | 3/1965 | U.S.S.R. | 414/745 |

Primary Examiner—William R. Briggs
Assistant Examiner—Glenn L. Webb
Attorney, Agent, or Firm—Murray, Whisenhunt and Ferguson

[57] ABSTRACT

A semi-automated plant for threading pipe, including oil and gas well casing and tubing, is disclosed. A particular sequencing of equipment activation and movement is utilized in order to have normal operations of the plant, from loading of unthreaded pipe to the unloading of pipe having threads on each end, and a coupling applied to at least one of the ends, performed without requiring manual handling of the pipe. One particularly important portion of the apparatus in the plant is the lifting device for raising the pipe to the height which is proper for the threading machine, or lathe, and a clamping device for clamping the pipe during the threading operation. By use of the disclosed apparatus, the pipe is accurately raised to the proper height, and pipe over a considerable range of size can be securely clamped during the threading operation.

6 Claims, 6 Drawing Figures

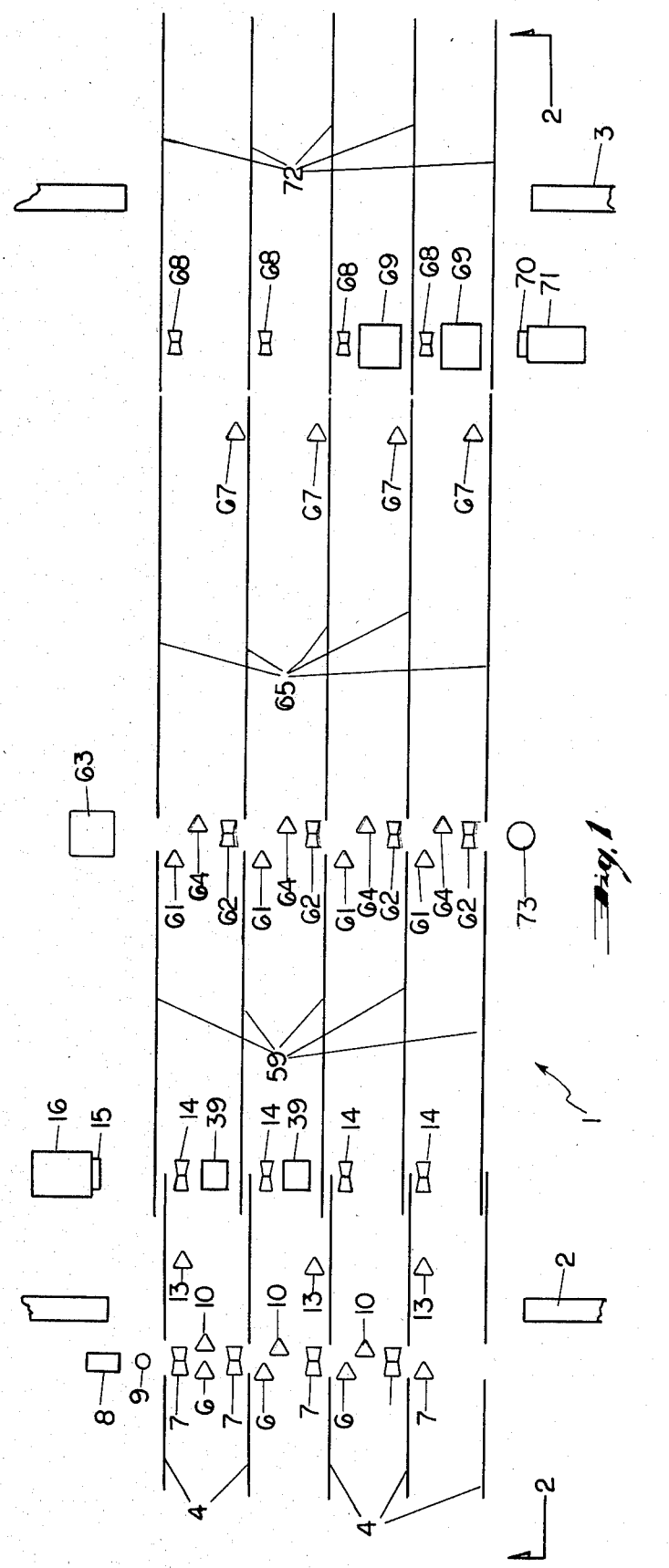
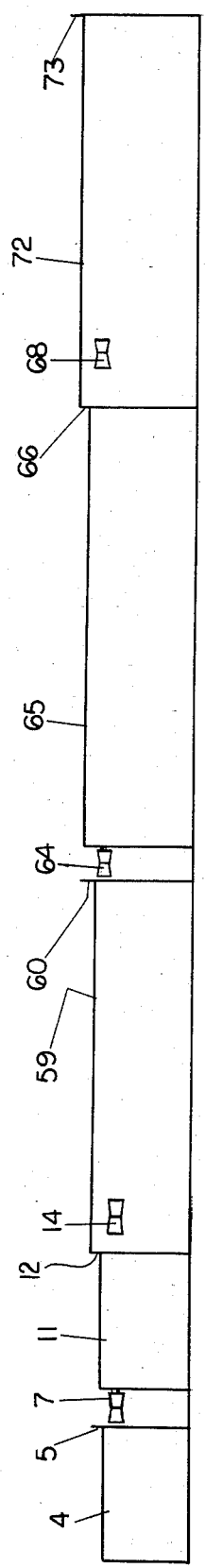

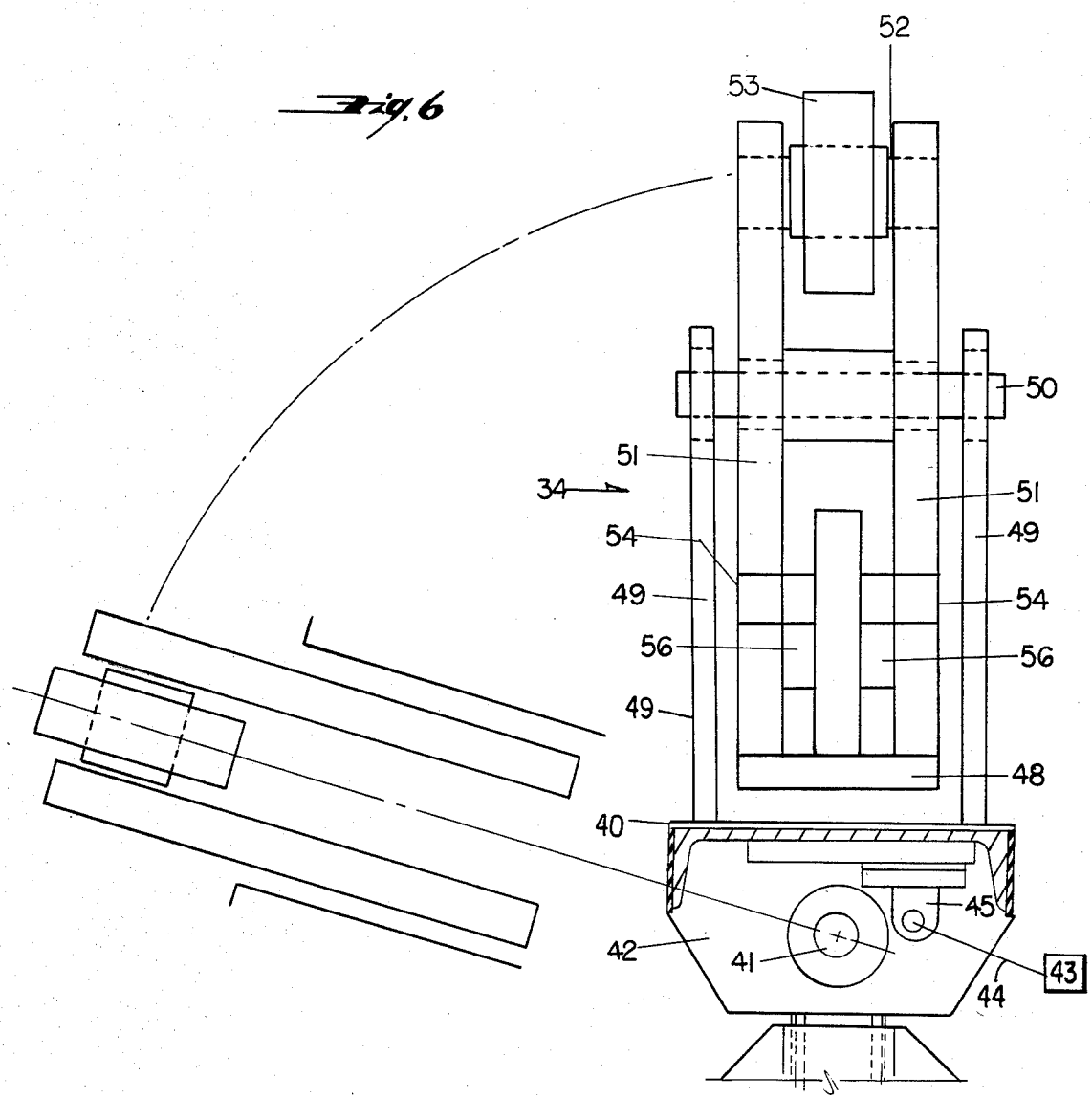

4,516,306

SEMI-AUTOMATIC PIPE THREADING PLANT AND APPARATUS THEREFOR

BACKGROUND OF THE INVENTION

A number of plants for the threading of pipe, such as pipe for the oil and gas field industries, utilize a flow sequence system wherein the pipe is introduced by inserting one end of the pipe into a building containing a pipe threading machine or lathe. Such plants require considerable personnel to operate, and because of extra handling of the pipe which may be involved the newly cut pipe threads can be subjected to damaging blows.

Certain three roll pipe clamps have been known to the art, wherein such pipe clamps included three rotatable rollers, a lower roller for contacting the bottom of the pipe to be clamped, and two upper rollers pivotable about a pivot area from an open position to a closed position wherein the pipe is firmly clamped between the three rollers.

SUMMARY OF THE INVENTION

One aspect of the present invention involves a semi-automated plant for the threading of pipe, such as tubing and casing for oil and gas wells. The plant includes a building and a first conveyor for receiving at a location outside of the building pipe which is to be threaded. The pipe is aligned while on the first conveyor and conveyed inside of the building through a side of the building, with the axial length of the pipe generally parallel to that building side. During passage through the plant of the present invention, the axial length of the pipe remains generally parallel to such building side. Two threading machines are provided to thread the opposite ends of the pipe within the building. A first threading machine is used to thread the exterior of a first end of the pipe after the pipe has been lifted from the first conveyor to the general level of the first threading machine. The lifting is accomplished by a combination of pneumatic and hydraulic lifts, with the pneumatic lift providing rapid movement of the pipe to the general vicinity of the first threading machine, and the hydraulic lift providing fine adjustment of the height to which the pipe is lifted so that the pipe is at the proper height for receipt in the first threading machine chuck. The pipe is moved into the threading machine chuck and then clamped by a three roll clamp during the threading operation. The three roll clamp firmly clamps the pipe in position but permits the pipe to rotate during the threading operation.

After the pipe is threaded it is lowered to a second conveyor which conveys the pipe away from the first threading machine to the vicinity of a bucking machine, wherein a coupling is applied to the threaded first end of the pipe. A lift is utilized to lift the pipe from the second conveyor to the proper height for the coupling to be applied. A third conveyor conveys the pipe from the bucking machine to the vicinity of the second threading machine, wherein threads are cut on the exterior of the second end of the pipe. A combination of pneumatic and hydraulic lift means lift the pipe from the third conveyor to the general level of the second threading machine chuck, with the same type of advantages as utilized for the lifts at the first threading machine. The same type of three roll clamps are used to clamp the pipe in position during the threading operation, after the pipe has been advanced into the second threading machine chuck. Finally, after the second thread has been applied to the pipe, a fourth conveyor conveys the pipe out of the building, with each end of the pipe threaded, and with at least one coupling thereon.

Another aspect of the present invention resides in the preferred apparatus for lifting and aligning an end of a pipe to a threading machine chuck for the cutting of a thread on the pipe, and for rotatably holding the pipe during the thread cutting. The apparatus includes a plurality of pipe rollers for holding a length of pipe and permitting the pipe to travel in its axial direction. Each pipe roller has pneumatic lifts and hydraulic lifts associated therewith. The pneumatic lifts are utilized to lift the pipe rollers and pipe thereon to the general height of a threading machine chuck, and the hydraulic lifts are used to adjust the position of each pipe roller and pipe thereon so that the pipe is aligned with and receivable in the threading machine chuck. The pipe rollers are driven rollers, such as by a suitable hydraulic motor, to move the pipe in the axial direction into the threading machine chuck. After the pipe is in the threading machine chuck, it is clamped by a three roll clamp which securely holds the pipe during the thread cutting operation while permitting the pipe to rotate with the threading machine chuck. The three roll clamp includes a lower roller which can be raised to a position for contacting the bottom of a pipe to be clamped, and two upper rollers which are in an upper, swingable position for rotational movement about a pivot area from an open position in which the clamp can be raised to contact the pipe which is to be held, to a closed position wherein the upper rollers rotate about the pivot area to firmly contact the pipe to clamp the pipe between the three rollers. The axis of each roller is generally parallel to the axial length of the pipe. Lifts are provided for raising and lowering the clamp into and out of position with the pipe to be held, with the upper two rollers rotating about the pivot area from the open to the closed position during the latter portion of time that the lower roller is being raised. The clamp can be pivoted on its side to permit a pipe to travel over the clamp, onto the driven rollers, without interference.

DESCRIPTION OF THE DRAWINGS

The invention will be understood more readily with reference to the accompanying drawings, wherein:

FIG. 1 is a schematic overhead view of the semi-automated plant of the present invention;

FIG. 2 is a schematic side view of the plant of FIG. 1, taken along line 2—2;

FIG. 6 is a side view of the three roll clamp of FIG. 5 in somewhat schematic form.

DETAILED DESCRIPTION OF THE DRAWING

Figure 3:
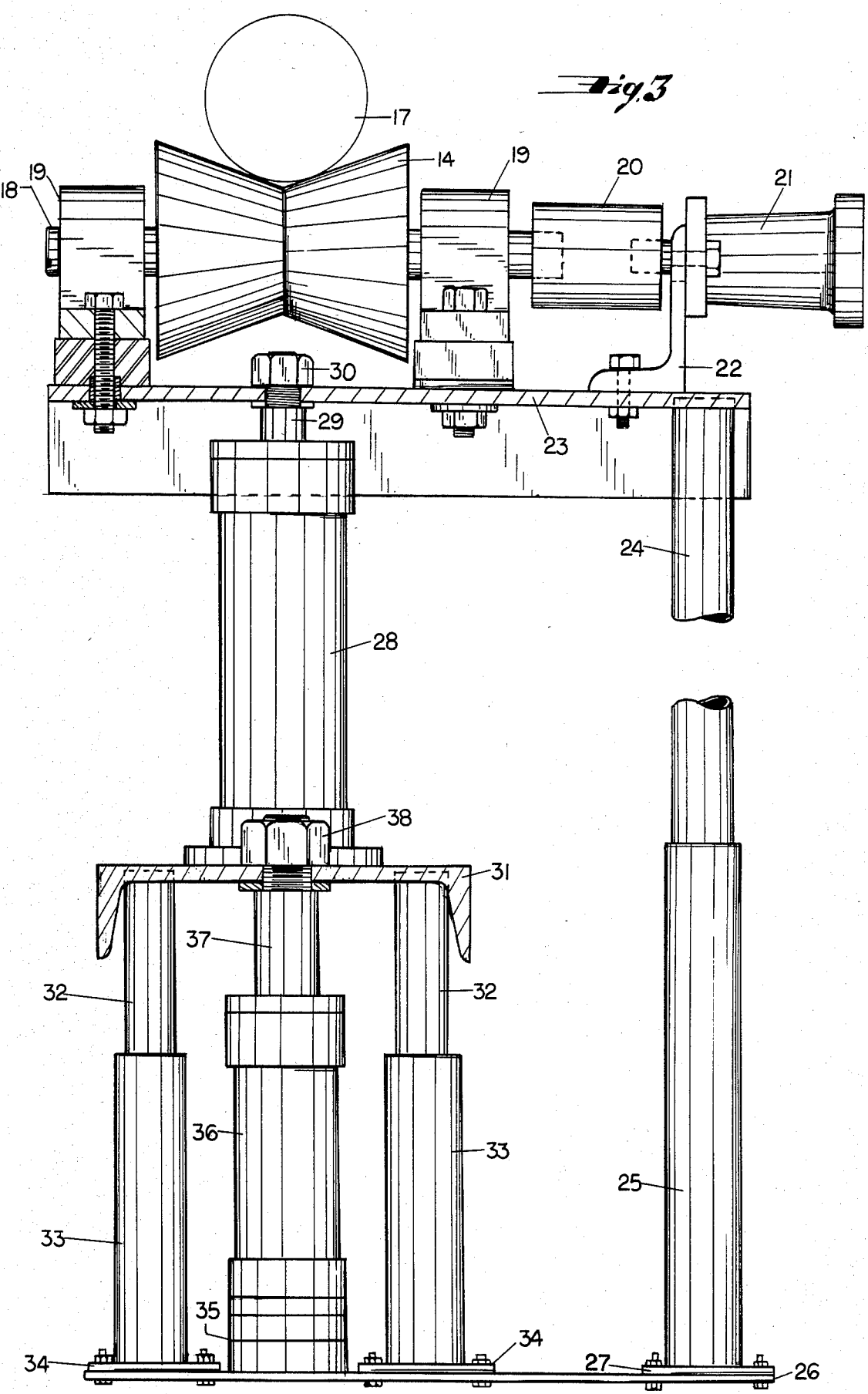
FIG. 3 is a partial cross-sectional front view of the threading machine feed rollers with associated hydraulic and pneumatic lifts.

The semi-automated plant of FIGS. 1 and 2 includes a building having front wall 2 and rear wall 3. Racks 4 receive pipe to be threaded from a suitable source, such as a fork lift truck, and as the racks 4 are slanted, the pipe rolls down the rack to a suitable stop 5. A plurality of lifts 6, of any suitable conventional design, raise one pipe at a time over stop 5 and onto driven rollers 7.

Rollers 7 advance the pipe in an axial direction towards stop 8. Photoelectric cell 9 has a photoelectric beam which is interrupted by the pipe when the pipe is in proper position, and when photoelectric cell 9 senses the pipe in proper position, the drives for rollers 7 are stopped, and then lifts 10 raise the pipe onto a second set of racks 11. Racks 11 are also slanted so that the pipe thereon rolls away from driven rollers 7 until the pipe reaches stop 12. A second set of lifts 13 raise the pipe over stop 12 and onto driven rollers 14. Using a combination of pneumatic and hydraulic cylinders, which will be explained in greater detail with reference to FIGS. 3 and 4, driven rollers 14 raise the pipe thereon to an appropriate level for entry into the chuck 15 of a threading machine 16. Threading machine 16 is conventional in nature, and the Mazak threading machine is preferred.

Figure 4:
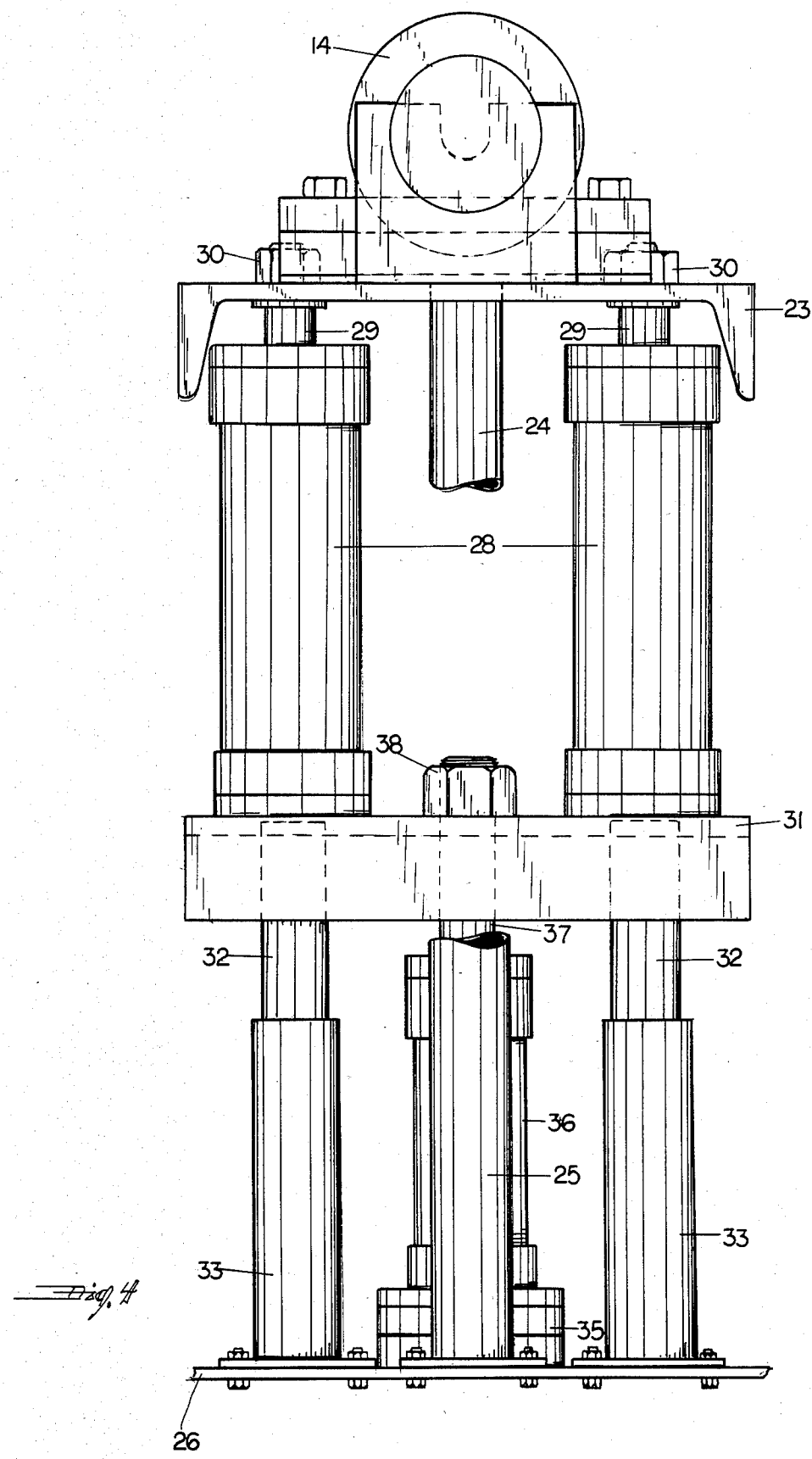
FIG. 4 is a side view of the roller of FIG. 3.

The driven roller 14 will be more readily understood with reference to FIGS. 3 and 4. Roller 14 has a V-shaped groove located around the circumference thereof, suitable for maintaining an elongated length of pipe 17 on the roller. Roller 14 is mounted on a shaft 18 mounted in a pair of bearings 19, and connected through coupler 20 to hydraulic motor 21, mounted by way of support 22 upon mounting plate 23. Mounting plate 23 is mounted upon a plurality of legs 24 which are received in a corresponding number of guide sleeves 25, which hold mounting plate 23 in a relatively fixed horizontal position but permit vertical movement of mounting plate 23 and items mounted thereon. Guide sleeve 25 is mounted on floor plate 26 by way of flange 27.

Pneumatic cylinders 28 are connected to mounting plate 23 by nut 30 attached to piston rod 29. Pneumatic cylinders 28 are attached at the opposite end to mounting plate 31, which is supported by a plurality of legs 32 received in guide sleeves 33. Guide sleeves 33 terminate in flanges 34 which are mounted on floor plate 26. Base 35 of hydraulic cylinder 36 is also mounted on base plate 26. The piston rod 37 is connected by nut 38 to mounting plate 31.

Reverting to FIGS. 1 and 2, three roll clamps 39 are located in association with driven rollers 14, and serve to firmly but rotatably clamp a length of pipe which is inserted into chuck 15 of threading machine 16 during the threading operation. Three roll clamps 39 will be understood more readily with reference to FIGS. 5 and 6 of the accompanying drawings, wherein three roll clamp 39 is shown mounted on mounting plate 40. Fixed pivot point axles 41 are journaled into supports 42 for rotational movement through an arc of approximately 70°, as schematically shown in FIG. 6. The rotational movement is caused by hydraulic cylinder 43, shown in block form in FIG. 6, acting through linkage 44 to fitting 45 firmly attached to mounting plate 40.

A pair of hydraulic cylinders 46 are mounted to the bottom of mounting plate 40, with piston rods 47 extending therethrough into connection with mounting plate 48.

A pair of side plates 49 are securely mounted upon mounting plate 40, and carry a pair of axles 50, with each axle having mounted thereon a pair of linkage arms 51. One end of each pair of linkage arms 51 has an axle 52 mounted therebetween, carrying an upper roller 53. The other end of each pair of linkage arms 51 has a shaft 54 attached thereinbetween. Each shaft 54 rides in an elongated slot 55 in support members 56. The lower end of support member 56 is firmly attached to mounting plate 48. The middle portion of support members 56 supports an axle 57 which rotatably carries lower roller 58.

Figure 5:
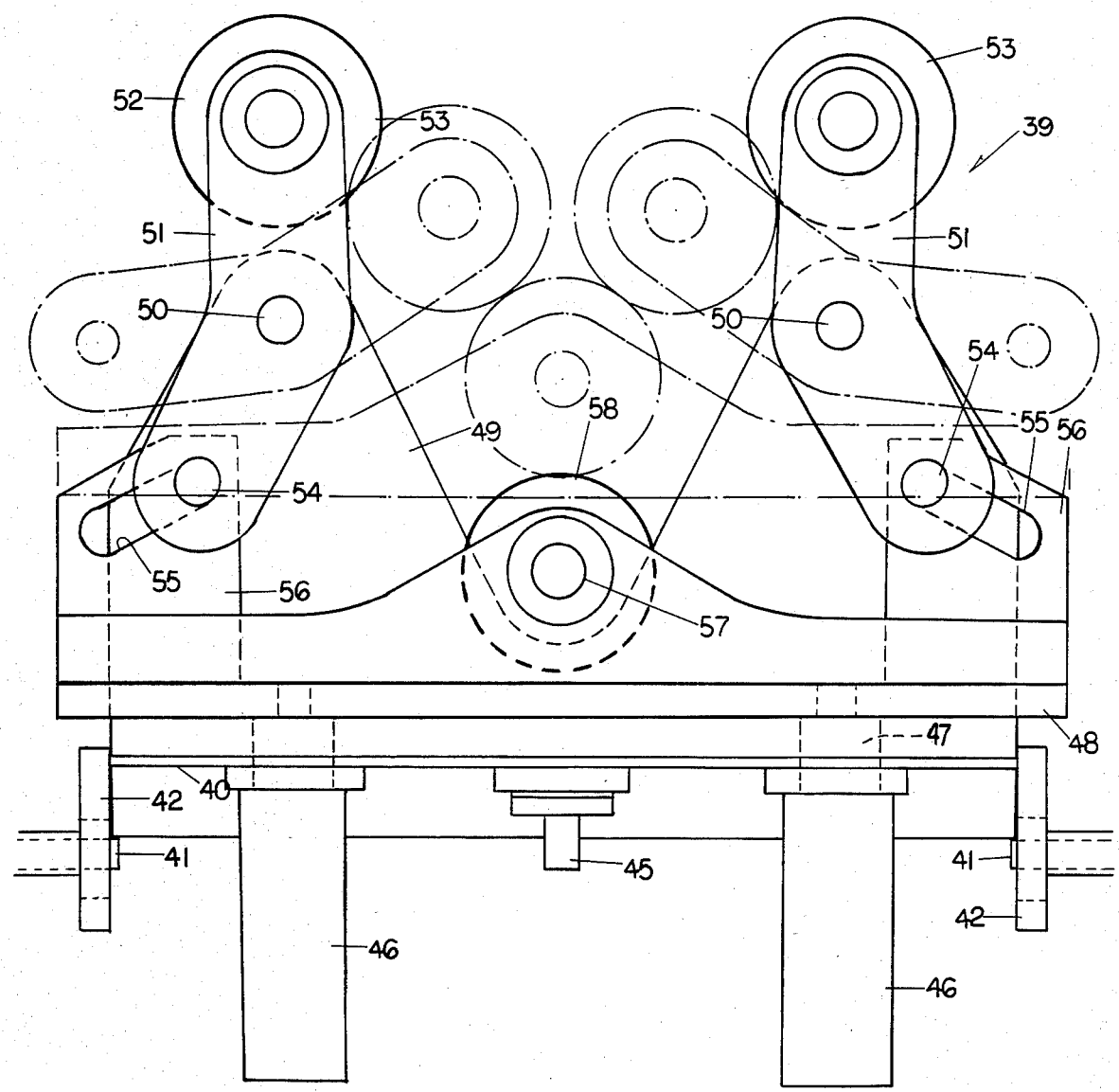
FIG. 5 is a partial cross-sectional front view of the three roll clamp of the present invention.

The upper rollers 53 are shown in their open position in solid lines in FIG. 5, and in their closed position with dashed lines in FIG. 5. Likewise, lower roller 58 is shown in its lower or open position in solid lines in FIG. 5, and in its upper position, corresponding to the closed position of upper rollers 53, in dashed lines.

When a pipe to be clamped is in proper position on driven rollers 14, and moved into appropriate position with one end in the chuck 15, the three roll clamp 39 is rotated from its down position, shown in the left of FIG. 6, to its upper position, shown in the right of FIG. 6, by action of hydraulic motor 43 acting through linkage 44 upon fitting 45, causing rotation of the three roll clamp 39 about pivot point axle 41. When so rotated, the pipe to be clamped should lie in the general area between the three rollers of three roll clamp 39. Hydraulic cylinders 46 are then activated to raise piston rods 47 and mounting plate 48, causing corresponding movement of support member 56, and lower roller 58 mounted thereon. The upward movement of support member 56 causes shafts 54 to rise and move outward in slots 55, causing corresponding downward rotation of upper rollers 53, until such point as the pipe to be clamped is firmly clamped between upper rollers 53 and lower roller 58.

Reverting to FIGS. 1 and 2, after the thread has been applied to one end of the pipe by threading machine 16, the pipe is released from three roll clamps 39 and lowered by means of driven rollers 14 onto third rack 59. The pipe rolls down third rack 59 under the force of gravity until it reaches stop 60. The pipe is then lifted by lifts 61 onto driven rollers 62. Driven rollers 62 are activated to move the pipe thereon into bucking machine 63, which is conventional in nature, and which applies a coupling to the threaded end of the pipe therein. After the coupling has been applied, the pipe is moved out of bucking machine 63 by drive rollers 62, until the opposite end of the pipe interrupts photoelectric cell 73 which stops drive rollers 62. The pipe is then moved by fifth lifts 64 onto fourth rack 65. The pipe travels down fourth rack 65, under the influence of gravity, until it reaches stop 66. At stop 66 the pipe is lifted by sixth lifts 67 onto driven rollers 68, which are identical to driven rollers 14 described above. Driven rollers 68 are in association with three roll clamps 69, which are identical to three roll clamps 39. Driven rollers 68 serve to raise, align, and move the pipe into position in chuck 70 of threading machine 71, and three roll clamps 69 rotatably clamp the pipe during the threading operation. After the threading of the second end of the pipe is complete, the three roll clamps 69 are moved out of clamping engagement with the pipe and pivotably retracted out of the way, and the pipe is lowered by driven rollers 68 onto fifth rack 72, and travels under the influence of gravity down rack 72 until stop 73, which is outside of rear wall 3, is reached, at which point the pipe can be unloaded from the semi-automated plant 1 of the present invention.

For simplicity various ancillary items of equipment have not been described hereinabove, but will be readily apparent to those in the art. For instance, conventional sensing means are used in combination with threading machines 16, 71 to sense when the pipe being moved by driven rollers 14, 68 is in proper position in chucks 15, 70, at which point the rollers 14, 68 cease to be driven. Various pieces of equipment may be utilized to aid in the movement of the pipe from various lifts onto various rollers or other pieces of equipment described hereinabove.

As will be appreciated from the above description, once the pipe is loaded upon first racks 4 it can pass through semi-automated plant 1 to fifth rack 72, and have suitable threads cut on each end thereof, and at least one coupling applied thereto, without being touched by human hands under normal conditions. While the above description has been directed to placing only a single coupling on each length of pipe, it will be readily apparent that a second bucking machine station, which would be identical to the bucking machine 63 and associated equipment, could be utilized to place a coupling on the second end of the pipe.

The three roll clamp described above has the capacity to handle pipe ranging in size from $2\frac{7}{8}$ inches in diameter to $13\frac{3}{8}$ inches in diameter. This permits the semi-automated plant 1 to be highly flexible in the size of casing, for instance, which is threaded thereon. If tubing is to be threaded, then changing the relative dimensions of the three roll clamp and associated equipment permits smaller sizes than the $2\frac{1}{2}$ inch diameter pipe mentioned above to be readily handled.

The combination of the driven rollers in association with pneumatic and hydraulic cylinders for raising same, and the three roll clamps described above, permits the pipe to be raised and accurately aligned with the threading machine chuck, moved into the chuck and then firmly clamped in position, but free to rotate, in a very accurate and reliable manner, permitting unusual precision in the accuracy of the threads to be cut thereon. Thus, this combination of the roller associated with pneumatic and hydraulic raising mechanism, in combination with the three roll clamp, is a highly significant feature of the present invention.

What is claimed is:

1. A semi-automated plant for threading pipe, said plant comprising a building, first conveyor means for receiving outside of said building pipe to be threaded, aligning said pipe and conveying said pipe to inside said building, with said pipe entering said building at a side thereof, with the axial length of the pipe generally parallel to that building side and at least one end of said pipe aligned with respect to a point on that building side, a first threading means for threading the exterior of a first end of said pipe at a location higher than the height of the first conveyor means at said building side, first pneumatic lift means for lifting said pipe from said first conveyor to the general level of said first threading means, first hydraulic lift means cooperating with said first pneumatic lift means for fine adjustment of the height to which said pipe is lifted so that said pipe is at the proper height for said first threading means, first three roll clamp means for clamping said pipe in position to be threaded by the use of three rollers, while permitting said pipe to rotate in said first threading means, bucking means for applying a coupling to the threaded first end of said pipe, second conveyor means for conveying said pipe from said first threading means to the vicinity of said bucking means, second lift means for lifting said pipe from said second conveyor means to the proper height for said coupling to be applied, second threading means for threading the exterior of the second end of said pipe, third conveyor means for conveying said pipe from said bucking means to the vicinity of said second threading means, said second threading means at a location higher than the height of said third conveyor means, second pneumatic lift means for lifting said pipe from said third conveyor means to the general level of said second threading means, second hydraulic lift means cooperating with said second pneumatic lift means for fine adjustment of the height to which said pipe is lifted so that said pipe is at the proper height for said second threading means, second three roll clamp means for clamping said pipe in position to be threaded by the use of three rollers, while permitting said pipe to rotate in said second threading means, and fourth conveyor means for conveying said pipe with each end threaded and at least one coupling thereon away from said second threading means and out of said building, with the pipe being maintained while in said plant generally parallel to said side of said building.

2. Plant of claim 1, wherein said three roll clamp means includes two upper roller means, and one lower roller means, each of said roller means having a roller axis, said lower roller means for rising to a position for contacting the bottom of a pipe to be clamped, and said upper roller means for rotational movement about a pivot point from an open position in which the three roll clamp means can be raised to contact the pipe to be held with said lower roller means, to a closed position wherein the said upper roller means rotate about said pivot point to firmly contact said pipe to clamp said pipe between said lower roller means and said upper roller means with each roller axis generally parallel to the axial length of said pipe, and lifting means for raising and lowering said upper and lower roller means into and out of contact with the pipe to be held, said upper roller means rotating about said pivot area during at least the latter portion of the time the lower roller means is being raised.

3. Plant of claim 2, further comprising a plurality of pipe roller means for holding a length of pipe and permitting the pipe to travel in its axial direction, pneumatic lifting means associated with each said pipe roller means for lifting the pipe roller means and pipe thereon to the general height of the threading means, hydraulic adjustment means associated with each said pipe roller means for adjusting the position of the pipe roller means so that pipe thereon is aligned with and receivable in the threading means, drive means for moving the pipe in the axial direction thereof while supported on said pipe roller means to place one end of the pipe into said threading means.

4. Plant of claim 3, wherein said upper and lower roller means and said three roll clamp means cooperate so that the three roll clamp means are rotated in a direction along the axial length of the pipe before a pipe is loaded upon said pipe roller means, the pipe roller means is then raised by said pneumatic lifting means to the general height of the threading means, the hydraulic adjustment means are then used if necessary to adjust the pipe into alignment with the threading means, an end of the pipe is moved into the threading means by said drive means, the three roll clamp means are rotated into a generally vertical position and raised until the lower roller means contacts the bottom of the pipe and both upper roller means are rotated into contact with the pipe to firmly but rotatably clamp said pipe during the threading of the pipe, while the pipe roller means are lowered away from said pipe, and after said threading the pipe roller means are raised and the lower roller means is lowered and the upper roller means are rotated away from the pipe, the three roll clamp means is rotated in a direction along the axial length of the pipe and thereafter the pipe roller means is lowered to unload the pipe thereon.

5. Plant of claim 1, wherein said first conveyor means includes photoelectric cell means for aligning said at least one end of said pipe with respect to a point on said building side.

6. Plant of claim 1, wherein said three roll clamp means are of a capacity to handle pipe having a diameter of at least from $2\frac{7}{8}$ inches to $13\frac{3}{8}$ inches.

* * * * *